(12) United States Patent
Yuan et al.

(10) Patent No.: US 10,345,994 B2
(45) Date of Patent: Jul. 9, 2019

(54) METHOD USED BY MOBILE TERMINAL TO RETURN TO HOME SCREEN, MOBILE TERMINAL AND STORAGE MEDIUM

(71) Applicant: Tencent Technology (Shenzhen) Company Limited, Shenzhen (CN)

(72) Inventors: Cancai Yuan, Shenzhen (CN); Junwei Liu, Shenzhen (CN); Jintao Qiu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 484 days.

(21) Appl. No.: 14/815,536

(22) Filed: Jul. 31, 2015

(65) Prior Publication Data

US 2015/0339012 A1 Nov. 26, 2015

Related U.S. Application Data

(63) Continuation of application No. PCT/CN2013/086862, filed on Nov. 11, 2013.

(30) Foreign Application Priority Data

Feb. 5, 2013 (CN) .......................... 2013 1 0046260

(51) Int. Cl.
*G06F 3/0481* (2013.01)
*G06F 3/0482* (2013.01)
(Continued)

(52) U.S. Cl.
CPC ............ *G06F 3/0482* (2013.01); *G06F 3/041* (2013.01); *G06F 3/0481* (2013.01);
(Continued)

(58) Field of Classification Search
None
See application file for complete search history.

(56) References Cited

U.S. PATENT DOCUMENTS

2009/0187840 A1* 7/2009 Moosavi ............... G06F 3/0482
715/767
2009/0271702 A1* 10/2009 Bamford .............. G06F 3/0483
715/702

(Continued)

FOREIGN PATENT DOCUMENTS

| CN | 101814002 A | 8/2010 |
| CN | 102236501 A | 11/2011 |
| CN | 102243662 A | 11/2011 |

OTHER PUBLICATIONS

Windows 8 Guide: How to Pin Things/Icons to task bar in Windows 8 [Ep.2] https://www.youtube.com/watch?v=rRb2zQnjN0g (Year: 2012).*

(Continued)

*Primary Examiner* — Jennifer N To
*Assistant Examiner* — Beau D Spratt
(74) *Attorney, Agent, or Firm* — Morgan, Lewis & Bockius LLP

(57) ABSTRACT

Embodiments of the present disclosure relate to the field of information processing technologies, and disclose a method used by a mobile terminal to return to a home screen, a mobile terminal and a storage medium. The method includes: determining whether the screen touching gesture is a gesture for displaying a virtual home screen button; displaying the virtual home screen button when the screen touching gesture on the current page is the gesture for displaying the virtual home screen button, and detecting whether the virtual home screen button is tapped; and returning from the current page to a home screen if the virtual home screen button is tapped. After it is detected that (Continued)

a screen touching gesture on a current page is a gesture for displaying a virtual home screen button, the virtual home screen button is displayed.

9 Claims, 3 Drawing Sheets

(51) Int. Cl.
　　*G06F 3/041* 　　(2006.01)
　　*G06F 3/0488* 　　(2013.01)
　　*G06F 3/0484* 　　(2013.01)
　　*G06F 3/01* 　　(2006.01)

(52) U.S. Cl.
　　CPC ........ *G06F 3/0488* (2013.01); *G06F 3/04842* (2013.01); *G06F 3/017* (2013.01)

(56) References Cited

U.S. PATENT DOCUMENTS

| | | | | |
|---|---|---|---|---|
| 2012/0297041 | A1* | 11/2012 | Momchilov | G06F 9/4451 |
| | | | | 709/223 |
| 2013/0086522 | A1* | 4/2013 | Shimazu | G06F 3/04817 |
| | | | | 715/810 |
| 2013/0162603 | A1* | 6/2013 | Peng | G06F 3/0418 |
| | | | | 345/178 |
| 2014/0053097 | A1* | 2/2014 | Shin | G06F 9/4443 |
| | | | | 715/779 |
| 2014/0109024 | A1* | 4/2014 | Miyazaki | G06F 3/04883 |
| | | | | 715/863 |
| 2014/0143728 | A1* | 5/2014 | Coleman, Jr. | G06F 3/0482 |
| | | | | 715/835 |

OTHER PUBLICATIONS

Tips General "move the show desktop icon to quick launch or taskbar" (2012 see search notes). http://tipsgeneral.com/how-to/move-the-show-desktop-icon-to-quick-launch-or-taskbar-in-windows-7.html (Year: 2012).*

Tencent Technology, ISRWO, PCT/CN2013/086862, Jan. 9, 2014, 10 pgs.

Tencent Technology, IPRP, PCT/CN2013/086862, Aug. 11, 2015, 5 pgs.

* cited by examiner ns in the following description show only some embodiments of the present disclosure, and a person of ordinary
METHOD USED BY MOBILE TERMINAL TO RETURN TO HOME SCREEN, MOBILE TERMINAL AND STORAGE MEDIUM

RELATED APPLICATIONS

This application is a continuation application of PCT Patent Application No. PCT/CN2013/086862, entitled "METHOD FOR MOBILE TERMINAL RETURNING TO MAIN SCREEN, MOBILE TERMINAL AND STORAGE MEDIUM THEREOF" filed on Nov. 11, 2013, which claims priority to Chinese Patent Application No. 201310046260.8, applied by Tencent Technology (Shenzhen) Company Limited, filed with the Chinese Patent Office on Feb. 5, 2013 and entitled "METHOD USED BY MOBILE TERMINAL TO RETURN TO HOME SCREEN, MOBILE TERMINAL AND STORAGE MEDIUM", both of which are incorporated herein by reference in their entirety.

FIELD OF THE TECHNOLOGY

The present disclosure relates to the field of information processing technologies, and in particular, to a method used by a mobile terminal to return to a home screen, a mobile terminal and a storage medium.

BACKGROUND OF THE DISCLOSURE

With continuous improvement of science and technologies, intelligent mobile terminals bring great convenience to life of people. When a user completes a related operation on an interface corresponding to an application, the user hopes that a mobile terminal can return to its home screen quickly, so as to save power and achieve a convenient operation.

Currently, two methods used by a mobile terminal to return to a home screen can be provided. In the first method, a physical home screen button is set on the mobile terminal, and the mobile terminal can return from a current page to a home screen by pressing the physical home screen button on the mobile terminal. In the second method, a function control icon that is circular inside and square outside is displayed on a page of the mobile terminal; after the function control icon is tapped, a menu that contains a virtual home screen button pops up; and after the virtual home screen button on the menu is tapped, the mobile terminal returns from the current page to the home screen.

Because the physical home screen button needs to be used every time when the mobile terminal returns to the home screen in the first method, the physical home screen button is easily damaged; the plug-in icon stays on the current page for a long time in the second method, which affects a user in use of other applications on the current page.

SUMMARY

Embodiments of the present disclosure provide a method used by a mobile terminal to return to a home screen, and a mobile terminal. The technical solutions are as follows:

According to a first aspect, a method used by a mobile terminal to return to a home screen is performed at the mobile terminal having one or more processors and memory storing a plurality of program modules to be executed by the one or more processors and a touchscreen, the method including:

detecting a screen touching gesture on a current page displayed on the touchscreen;

determining whether the screen touching gesture is a gesture for displaying a virtual home screen button;

displaying the virtual home screen button when the screen touching gesture on the current page is the gesture for displaying the virtual home screen button, and detecting whether the virtual home screen button is tapped; and returning from the current page to a home screen when the virtual home screen button is tapped.

According to another aspect, a mobile terminal is provided, the mobile terminal including one or more processors, a touchscreen, memory and a plurality of program modules stored in the memory and to be executed by the one or more processors, the plurality of program modules further including:

a first detection module, configured to detect a screen touching gesture on a current page displayed on the touchscreen and determine whether the screen touching gesture is a gesture for displaying a virtual home screen button;

an activating module, configured to display the virtual home screen button when the screen touching gesture on the current page is the gesture for displaying the virtual home screen button;

a second detection module, configured to detect whether the virtual home screen button called by the activating module is tapped; and a returning module, configured to return from the current page to a home screen when the second detection module detects that the virtual home screen button is tapped.

According to still another aspect, a non-transitory computer readable storage medium including one or more computer executable instructions is provided, the computer executable instructions being executed by one or more processors of a mobile terminal having a touchscreen, and the computer executable instructions comprising the following steps:

detecting a screen touching gesture on a current page displayed on the touchscreen;

determining whether the screen touching gesture is a gesture for displaying a virtual home screen button;

displaying the virtual home screen button when the screen touching gesture on the current page is the gesture for displaying the virtual home screen button, and detecting whether the virtual home screen button is tapped; and returning from the current page to a home screen if the virtual home screen button is tapped.

Thus, after it is detected that a screen touching gesture on a current page is a gesture for displaying a virtual home screen button, the virtual home screen button is displayed; or when it is not detected that a screen touching gesture on a current page is a gesture for displaying a virtual home screen button, the virtual home screen button is hidden, so that a user is not affected in use of other applications on the current page. In addition, after it is detected that the virtual home screen button is tapped, a mobile terminal returns from the current page to a home screen, thereby avoiding that a physical home screen button is easily damaged after being used multiple times.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

To make objectives, technical solutions and advantages of the present disclosure clearer, the implementation manners of the present disclosure are further described with reference to the accompanying drawings in the following.

Figure 1:
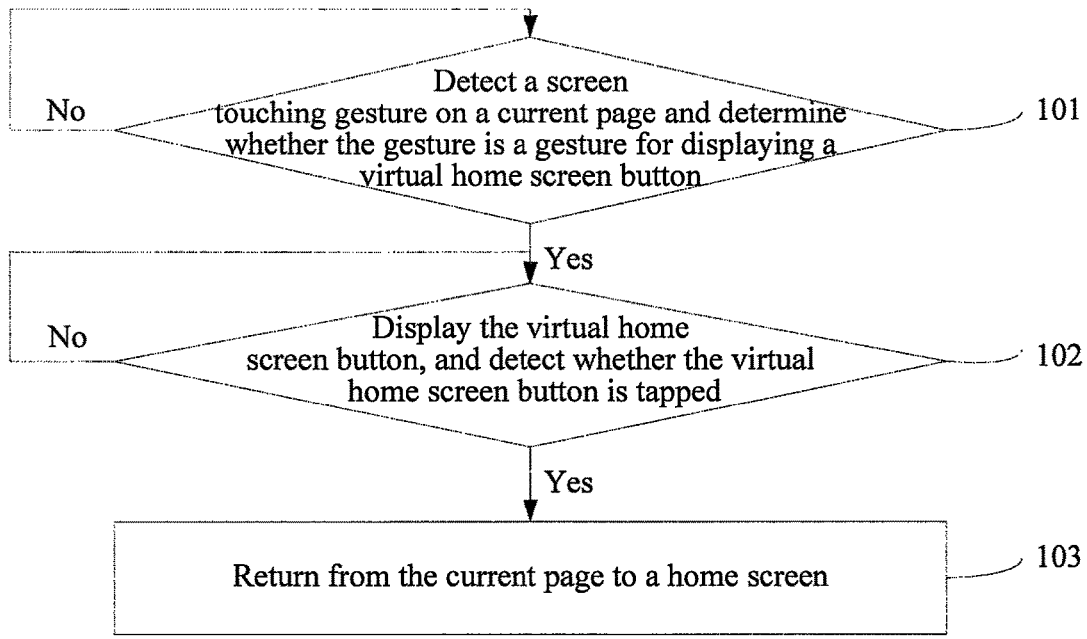
FIG. 1 is a flowchart of a method used by a mobile terminal to return to a home screen according to an embodiment of the present disclosure.

Referring to FIG. 1, this embodiment provides a method used by a mobile terminal having a touchscreen to return to a home screen, where a flow of the method provided by this embodiment includes:

Step 101: Detect a screen touching gesture on a current page displayed on the touchscreen and determine whether the screen touching gesture is a gesture for displaying a virtual home screen button.

The method performs step 102 when the screen touching gesture on the current page is the gesture for displaying the virtual home screen button; and goes back to step 101 when the screen touching gesture on the current page is not the gesture for displaying the virtual home screen button.

Furthermore, the step of determining whether the screen touching gesture is a gesture for displaying a virtual home screen button includes but is not limited to:

determining whether a touching track corresponding to the screen touching gesture on the current page is identical to a preset track corresponding to the gesture for displaying the virtual home screen button; and when the touching track corresponding to the screen touching gesture on the current page is identical to the preset track corresponding to the gesture for displaying the virtual home screen button, determining that the screen touching gesture on the current page is the gesture for displaying the virtual home screen button.

Step 102: Display the virtual home screen button, and detect whether the virtual home screen button is tapped; perform step 103 when the virtual home screen button is tapped; and go back to step 102 when the virtual home screen button is not tapped, to detect whether the virtual home screen button is tapped.

Furthermore, the virtual home screen button is displayed on a multi-taskbar page.

The step of displaying the virtual home screen button includes but is not limited to:

displaying the multi-taskbar page, and displaying the virtual home screen button on the multi-taskbar page.

Furthermore, the step of detecting whether the virtual home screen button is tapped includes but is not limited to:

detecting a tapping operation on the multi-taskbar page, and determining whether the virtual home screen button displayed on the multi-taskbar page is tapped according to the detected tapping operation.

Furthermore, before the step of determining whether the virtual home screen button displayed on the multi-taskbar page is tapped according to the detected tapping operation, the method further includes:

presetting a location of the virtual home screen button on the multi-taskbar page, and recording location coordinates of the virtual home screen button on the multi-taskbar page;

The step of determining whether the virtual home screen button displayed on the multi-taskbar page is tapped according to the detected tapping operation includes but is not limited to:

presetting a location of the virtual home screen button on the multi-taskbar page, and recording location coordinates of the virtual home screen button on the multi-taskbar page;

positioning location coordinates of the detected tapping operation on the multi-taskbar page;

comparing the positioned location coordinates with the location coordinates of the virtual home screen button on the multi-taskbar page; and when the positioned location coordinates are consistent with the location coordinates of the virtual home screen button on the multi-taskbar page, determining that the virtual home screen button displayed on the multi-taskbar page is tapped.

Step 103: Return from the current page to a home screen.

In the method provided by this embodiment, only after it is detected that a screen touching gesture on a current page is a gesture for displaying a virtual home screen button, the virtual home screen button is displayed; or when it is not detected that a screen touching gesture on a current page is a gesture for displaying a virtual home screen button, the virtual home screen button is hidden, so that a user is not affected in use of other applications on the current page. In addition, after it is detected that the virtual home screen button is tapped, a mobile terminal returns from the current page to a home screen, thereby avoiding that a physical home screen button is easily damaged after being used multiple times.

Figure 2:
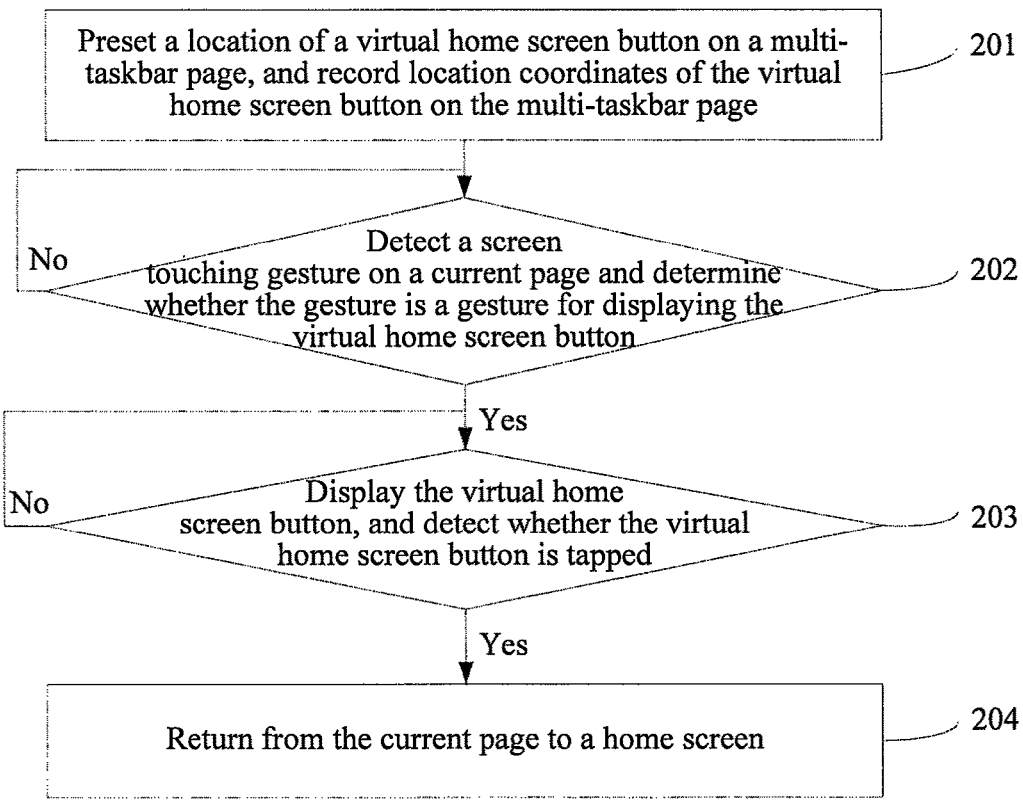
FIG. 2 is a flowchart of a method used by a mobile terminal to return to a home screen according to an embodiment of the present disclosure.

An embodiment of the present disclosure provides a method used by a mobile terminal to return to a home screen. Herein, with reference to the foregoing content of Embodiment 1, the method used by a mobile terminal to return to a home screen provided by this embodiment is illustrated in detail by using an example in which a virtual home screen button is displayed on a multi-taskbar page. Referring to FIG. 2, a flow of the method provided by this embodiment includes:

Step 201: Preset a location of a virtual home screen button on a multi-taskbar page, and record location coordinates of the virtual home screen button on the multi-taskbar page.

Specifically, the multi-taskbar page is a graphical interface used for displaying an application program in a running state, and a user of a mobile terminal frequently calls the multi-taskbar page to check which application programs are currently running on the mobile terminal. Therefore, the user may choose to set the virtual home screen button on the multi-taskbar page during location setting of the virtual home screen button. After the virtual home screen button is set on the multi-taskbar page, location coordinates of the virtual home screen button on the multi-taskbar page need to be recorded.

A specific implementation manner of recording the location coordinates of the virtual home screen button on the multi-taskbar page includes but is not limited to: acquiring a location of the virtual home screen button on the multi-taskbar page with respect to a screen of the mobile terminal, calculating the location coordinates of the virtual home screen button by using the location of the virtual home screen button on the multi-taskbar page with respect to the screen of the mobile terminal, and storing the acquired location coordinates in the form of numerical values in a storage medium. The storage medium may specifically be a terminal memory, and this embodiment does not specifically limit a type of the storage medium; in addition, apart from the foregoing manner of recording the location coordinates of the virtual home screen button on the multi-taskbar page, other recording manners may also be adopted, which is not specifically limited in this embodiment either.

It should be noted that this step can be performed when the method provided by this embodiment is performed for the first time, and every time the method provided by this embodiment is performed subsequently, the method can be implemented according to the location of the virtual home screen button that is set at this time. Certainly, this step can be performed again if the location of the virtual home screen button on the multi-taskbar page needs to be adjusted, so as to update the location coordinates of the virtual home screen button on the multi-taskbar page.

Furthermore, apart from being set on the multi-taskbar page, the virtual home screen button may also be set on another graphical interface, or a graphical interface that is dedicated to storing the virtual home screen button is newly established. This embodiment only provides one impossible implementation manner, and this embodiment does not specifically limit the graphical interface for storing the virtual home screen button.

Step 202: Detect whether a screen touching gesture on a current page is a gesture for displaying the virtual home screen button; perform step 203 when the screen touching gesture on the current page is the gesture for displaying the virtual home screen button; and go back to step 202 when the screen touching gesture on the current page is not the gesture for displaying the virtual home screen button.

In this step, the gesture for displaying the virtual home screen button may be a straight-line sliding gesture from the bottom to the top of the screen of the mobile terminal, a straight-line sliding gesture from the left to the right of the screen of the mobile terminal, a straight-line siding gesture from the top to the bottom of the screen of the mobile terminal, or the like; and this embodiment does not specifically limit a form of the gesture for displaying the virtual home screen button.

The step of determining whether the screen touching gesture is a gesture for displaying a virtual home screen button includes but is not limited to:
determining whether a touching track corresponding to the screen touching gesture on the current page is identical to a preset track corresponding to the gesture for displaying the virtual home screen button; and
determining, if the touching track corresponding to the screen touching gesture on the current page is identical to the preset track corresponding to the gesture for displaying the virtual home screen button, that the screen touching gesture on the current page is the gesture for displaying the virtual home screen button.

By using an example in which the preset track corresponding to the gesture for displaying the virtual home screen button is a straight line from the bottom to the top of the screen of the mobile terminal, if it is detected that the screen touching gesture on the current page is also a straight line from the bottom to the top of the screen of the mobile terminal, the touching track corresponding to the screen touching gesture on the current page is the same as the preset track corresponding to the gesture for displaying the virtual home screen button, that is, it is determined that the screen touching gesture on the current page is the gesture for displaying the virtual home screen button.

It should be noted that the operation of returning to a home screen by a mobile terminal ends if it is detected in this step that the screen touching gesture on the current page is not the gesture for displaying the virtual home screen button; however, if the screen touching gesture corresponds to another operation, the another operation corresponding to the screen touching gesture may be continued, and this embodiment does not specifically limit the content of the another operation.

Step 203: Display the virtual home screen button, and detect whether the virtual home screen button is tapped; perform step 204 if the virtual home screen button is tapped; and go back to step 203 if the virtual home screen button is not tapped, to continue to detect whether the virtual home screen button is tapped.

In this step, because the virtual home screen button is set on the multi-taskbar page in step 201, the displaying the virtual home screen button includes but is not limited to:
displaying the multi-taskbar page, and displaying the virtual home screen button on the multi-taskbar page.

Figure 3:
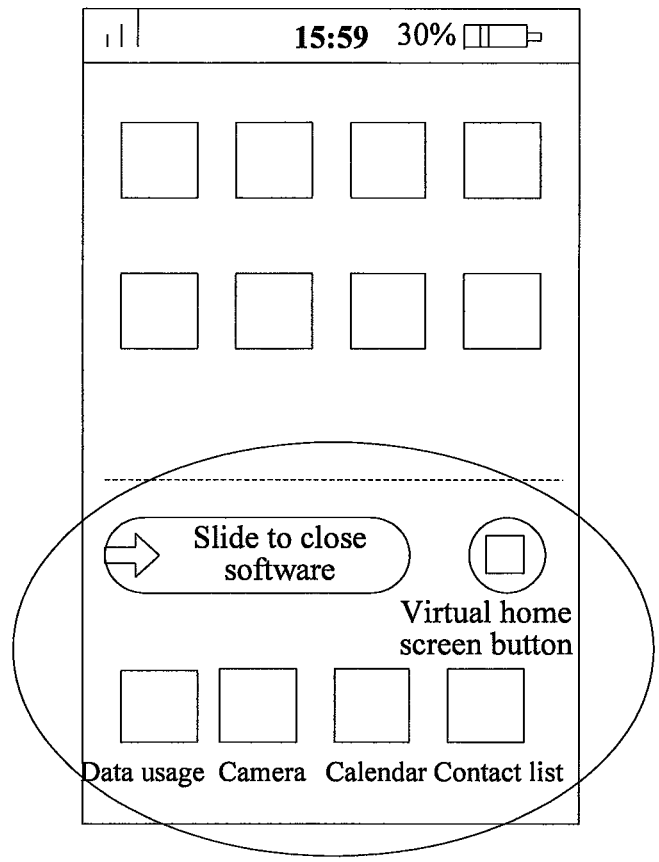
FIG. 3 is a schematic diagram of a mobile terminal screen displaying a multi-taskbar page according to an embodiment of the present disclosure.

A manner of displaying the multi-taskbar page may be a activating manner from the bottom to the top of the screen, a activating manner from the top to the bottom of the screen, a activating manner from the left to the right of the screen, or a activating manner from the right to the left of the screen, which is not specifically limited in this embodiment. When the activating manner from the bottom to the top of the screen is used, a view of the multi-taskbar page is shown as an elliptic area in FIG. 3.

Furthermore, the step of detecting whether the virtual home screen button is tapped includes but is not limited to:
detecting a tapping operation on the multi-taskbar page, and determining whether the virtual home screen button displayed on the multi-taskbar page is tapped according to the detected tapping operation.

The step of determining whether the virtual home screen button displayed on the multi-taskbar page is tapped according to the detected tapping operation includes but is not limited to:
presetting a location of the virtual home screen button on the multi-taskbar page, and recording location coordinates of the virtual home screen button on the multi-taskbar page;
positioning location coordinates of the detected tapping operation on the multi-taskbar page;
comparing the positioned location coordinates with the location coordinates of the virtual home screen button on the multi-taskbar page; and
determining, if the positioned location coordinates are consistent with the location coordinates of the virtual home screen button on the multi-taskbar page, that the virtual home screen button displayed on the multi-taskbar page is tapped.

For ease of understanding, by using an example in which a rectangular plane coordinate system using a geometric center of the screen of the mobile terminal as a coordinate origin is established, and the preset location coordinates of the virtual home screen button on the multi-taskbar page are coordinate values (a, b), a process of detecting whether the virtual home screen button is tapped is specifically described in the following:

After the multi-taskbar page is displayed, if the user performs a tapping operation on the multi-taskbar page, the tapping operation is positioned, and location coordinates of the tapping operation are recorded. For example, if the location coordinates of the positioned tapping operation are (a1, b1), the coordinates (a, b) are compared with the coordinates (a1, b1); if the coordinates (a, b) are consistent with the coordinates (a1, b1), it is determined that the virtual home screen button displayed on the multi-taskbar page is tapped, and the subsequent step 204 is continued to be performed; and if the coordinates (a, b) are inconsistent with the coordinates (a1, b1), it is determined that the virtual home screen button displayed on the multi-taskbar page is not tapped, and the operation of returning to the home screen ends.

Step 204: Return from the current page to a home screen.

Specifically, a specific implementation manner of returning from the current page to the home screen includes but is not limited to: jumping directly from the current page to the home screen. Apart from the foregoing manner of returning from the current page to the home screen, other manners of returning from the current page to the home screen may be used, which is not specifically limited in this embodiment.

In the method provided by this embodiment, only after it is detected that a screen touching gesture on a current page is a gesture for displaying a virtual home screen button, the virtual home screen button is displayed; or when it is not detected that a screen touching gesture on a current page is a gesture for displaying a virtual home screen button, the virtual home screen button is hidden, so that a user is not affected in use of other applications on the current page. In addition, after it is detected that the virtual home screen button is tapped, a mobile terminal returns from the current page to a home screen, thereby avoiding that a physical home screen button is easily damaged after being used multiple times.

Figure 4:
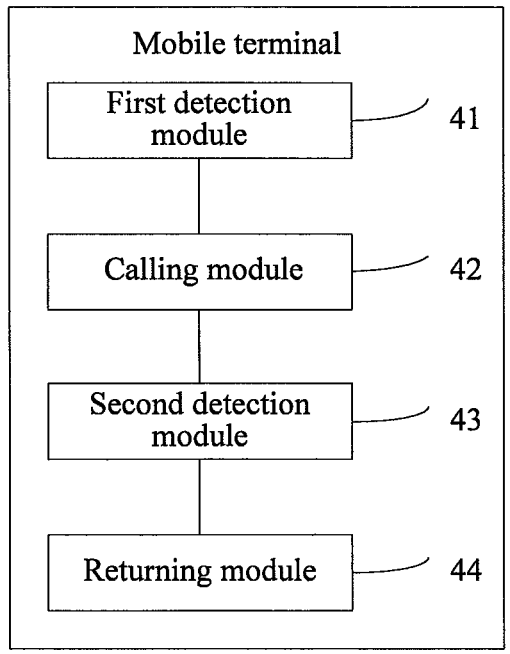
FIG. 4 is a schematic structural diagram of a mobile terminal according to an embodiment of the present disclosure.

An embodiment of the present disclosure provides a mobile terminal which is configured to perform the method provided by the foregoing Embodiment 1 or Embodiment 2, and referring to FIG. 4, the mobile terminal includes:

a first detection module 41, configured to detect a screen touching gesture on a current page displayed on the touchscreen and determine whether the screen touching gesture is a gesture for displaying a virtual home screen button;

an activating module 42, configured to display the virtual home screen when the first detection module 41 determines that the screen touching gesture on the current page is the gesture for displaying the virtual home screen button;

a second detection module 43, configured to detect whether the virtual home screen button called by the activating module 42 is tapped; and a returning module 44, configured to return from the current page to a home screen when the second detection module 43 detects that the virtual home screen button is tapped.

Furthermore, the first detection module 41 is configured to determine whether a touching track corresponding to the screen touching gesture on the current page is identical to a preset track corresponding to the gesture for displaying the virtual home screen button; and determine, if the touching track corresponding to the screen touching gesture on the current page is identical to the preset track corresponding to the gesture for displaying the virtual home screen button, that the screen touching gesture on the current page is the gesture for displaying the virtual home screen button.

Furthermore, the virtual home screen button is displayed on a multi-taskbar page.

The activating module 42 is configured to display the multi-taskbar page, and display the virtual home screen button on the multi-taskbar page.

Figure 5:
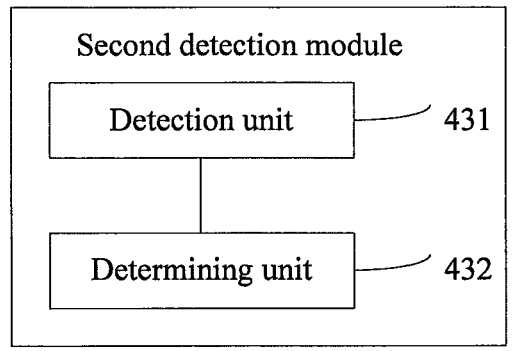
FIG. 5 is a schematic internal structural diagram of a second detection module according to an embodiment of the present disclosure.

Furthermore, referring to FIG. 5, the second detection module 43 includes:

a detection unit 431, configured to detect a tapping operation on the multi-taskbar page; and a determining unit 432, configured to determine, according to the tapping operation detected by the detection unit 341, whether the virtual home screen button displayed on the multi-taskbar page is tapped.

Figure 6:
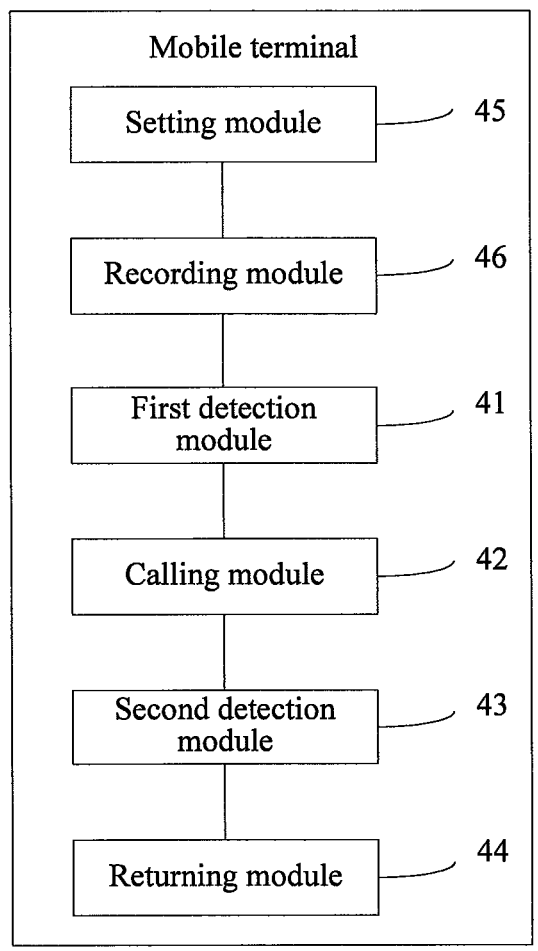
FIG. 6 is a schematic structural diagram of another mobile terminal according to an embodiment of the present disclosure.

Furthermore, referring to FIG. 6, the mobile terminal further includes:

a setting module 45, configured to preset a location of the virtual home screen button on the multi-taskbar page; and a recording module 46, configured to record location coordinates of the virtual home screen button on the multi-taskbar page; and the step of determining unit 432 is configured to position location coordinates of the detected tapping operation on the multi-taskbar page; compare the positioned location coordinates with the location coordinates of the virtual home screen button on the multi-taskbar page; and when the positioned location coordinates are consistent with the location coordinates of the virtual home screen button on the multi-taskbar page, determine that the virtual home screen button displayed on the multi-taskbar page is tapped.

To sum up, the mobile terminal provided by this embodiment of the present disclosure calls a virtual home screen button only after detecting that a screen touching gesture on a current page is a gesture for displaying the virtual home screen button; or hides a virtual home screen button when not detecting that a screen touching gesture on a current page is a gesture for displaying the virtual home screen button, so that a user is not affected in use of other applications on the current page. In addition, the mobile terminal returns from the current page to a home screen after detecting that the virtual home screen button is tapped, thereby avoiding that a physical home screen button is easily damaged after being used multiple times.

It should be noted that the above functional modules are only described for exemplary purposes when the mobile terminal provided by the foregoing embodiment returns to the home screen. In actual applications, the functions may be allocated to different functional modules according to specific needs, which means that the internal structure of the mobile terminal is divided to different functional modules to complete all or some of the above described functions. In addition, the mobile terminal provided by the foregoing embodiments is based on the same concept as the method used by a mobile terminal to return to a home screen in the foregoing embodiments. For the specific implementation process, refer to the method embodiments, and the details are not described herein again.

The sequence numbers of the foregoing embodiments of the present disclosure are merely for the convenience of description, and do not imply the preference among the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

An embodiment of the present disclosure further provides a non-transitory computer readable storage medium including one or more computer executable instructions, the computer executable instructions being executed by one or more processors of a mobile terminal having a touchscreen, and the computer executable instructions comprising the following steps:

detecting a screen touching gesture on a current page displayed on the touchscreen;

determining whether the screen touching gesture is a gesture for displaying a virtual home screen button;

displaying the virtual home screen button when the screen touching gesture on the current page is the gesture for displaying the virtual home screen button, and detecting whether the virtual home screen button is tapped; and returning from the current page to a home screen if the virtual home screen button is tapped.

The above descriptions are merely preferred embodiments of the present disclosure, and are not intended to limit the present disclosure. Any modification, equivalent replacement, or improvement made within the spirit and principle of the present disclosure shall fall within the protection scope of the present disclosure.

What is claimed is:

1. A method used by a mobile terminal to return to a home screen, comprising:
   at the mobile terminal having one or more processors and memory storing a plurality of program modules to be executed by the one or more processors and a touchscreen:
      detecting a screen touching gesture on a current page displayed on the touchscreen before displaying a virtual home screen button;
      determining whether the screen touching gesture is a gesture for displaying the virtual home screen button, wherein:
         the virtual home screen button is set to be displayed at a preset location on a multi-taskbar page that is configured to display representations of application programs that are currently running on the mobile terminal,
         the preset location of the virtual home screen button on the multi-taskbar page is adjustable in accordance with user input, and
         the mobile terminal has, according to prior user input, set a first location of the virtual home screen button on the multi-taskbar page as the preset location of the virtual home screen button, and recorded location coordinates of the first location of the virtual home screen button on the multi-taskbar page, including acquiring a respective location of the virtual home screen button on the multi-taskbar page with respect to the touchscreen of the mobile terminal and calculating the location coordinates of the first location using the respective location of the virtual home screen button on the multitask bar page with respect to the touchscreen of the mobile terminal;
      displaying the virtual home screen button in accordance with a determination that the screen touching gesture on the current page is the gesture for displaying the virtual home screen button, wherein displaying the virtual home screen button further comprises displaying the multi-taskbar page, and displaying the virtual home screen button on the multi-taskbar page, and wherein the virtual home screen button is displayed at the first location which is the preset location on the multi-taskbar page that is adjustable in accordance with user input;
      while displaying the virtual home screen button, detecting whether the virtual home screen button is tapped, wherein detecting whether the virtual home screen button is tapped further comprises:
         detecting a tapping operation on the multi-taskbar page; and
         determining whether the virtual home screen button displayed on the multi-taskbar page is tapped according to the detected tapping operation and the recorded location coordinates of the first location of the virtual home screen button on the multi-taskbar page; and
      returning from the current page to the home screen in accordance with a determination that the virtual home screen button displayed on the multi-taskbar page is tapped.

2. The method according to claim 1, wherein the step of determining whether the screen touching gesture is a gesture for displaying the virtual home screen button further comprises:
   determining whether a touching track corresponding to the screen touching gesture on the current page is identical to a preset track corresponding to the gesture for displaying the virtual home screen button; and
   when the touching track corresponding to the screen touching gesture on the current page is identical to the preset track corresponding to the gesture for displaying the virtual home screen button, determining that the screen touching gesture on the current page is the gesture for displaying the virtual home screen button.

3. The method according to claim 1,
wherein determining whether the virtual home screen button displayed on the multi-taskbar page is tapped according to the detected tapping operation includes:
   positioning location coordinates of the detected tapping operation on the multi-taskbar page;
   comparing the positioned location coordinates with the location coordinates of the virtual home screen button on the multi-taskbar page; and
   when the positioned location coordinates are consistent with the location coordinates of the virtual home screen button on the multi-taskbar page, determining that the virtual home screen button displayed on the multi-taskbar page is tapped.

4. A mobile terminal, comprising:
one or more processors;
a touchscreen;
memory; and
a plurality of program modules stored in the memory and to be executed by the one or more processors, the plurality of program modules including instructions for:
   detecting a screen touching gesture on a current page displayed on the touchscreen before displaying a virtual home screen button;
   determining whether the screen touching gesture is a gesture for displaying the virtual home screen button, wherein:
      the virtual home screen button is set to be displayed at a preset location on a multi-taskbar page that is configured to display representations of application programs that are currently running on the mobile terminal,
      the preset location of the virtual home screen button on the multi-taskbar page is adjustable in accordance with user input, and the mobile terminal has, according to prior user input, set a first location of the virtual home screen button on the multi-taskbar page as the preset location of the virtual home screen button, and recorded location coordinates of the first location of the virtual home screen button on the multi-taskbar page, including acquiring a respective location of the virtual home screen button on the multi-taskbar page with respect to the touchscreen of the mobile terminal and calculating the location coordinates of the first location using the respective location of the virtual home screen button on the multitask bar page with respect to the touchscreen of the mobile terminal;

displaying the virtual home screen button in accordance with a determination that the screen touching gesture on the current page is the gesture for displaying the virtual home screen button, wherein displaying the virtual home screen button further comprises displaying the multi-taskbar page, and displaying the virtual home screen button on the multi-taskbar page, and wherein the virtual home screen button is displayed at the first location which is the preset location on the multi-taskbar page that is adjustable in accordance with user input;

while displaying the virtual home screen button, detecting whether the virtual home screen button is tapped, wherein detecting whether the virtual home screen button is tapped further comprises:

detecting a tapping operation on the multi-taskbar page; and determining whether the virtual home screen button displayed on the multi-taskbar page is tapped according to the detected tapping operation and the recorded location coordinates of the first location of the virtual home screen button on the multi-taskbar page; and returning from the current page to the home screen in accordance with a determination that the virtual home screen button displayed on the multi-taskbar page is tapped.

5. The mobile terminal according to claim 4, wherein determining whether the screen touching gesture is a gesture for displaying the virtual home screen button further includes:

determine whether a touching track corresponding to the screen touching gesture on the current page is identical to a preset track corresponding to the gesture for displaying the virtual home screen button, and when the touching track corresponding to the screen touching gesture on the current page is identical to the preset track corresponding to the gesture for displaying the virtual home screen button, determine that the screen touching gesture on the current page is the gesture for displaying the virtual home screen button.

6. The mobile terminal according to claim 4, wherein determining whether the virtual home screen button displayed on the multi-taskbar page is tapped according to the detected tapping operation includes:

positioning location coordinates of the detected tapping operation on the multi-taskbar page;

comparing the positioned location coordinates with the location coordinates of the virtual home screen button on the multi-taskbar page; and when the positioned location coordinates are consistent with the location coordinates of the virtual home screen button on the multi-taskbar page, determining that the virtual home screen button displayed on the multi-taskbar page is tapped.

7. A non-transitory computer readable storage medium storing one or more computer executable instructions, the computer executable instructions being executed by one or more processors of a mobile terminal having a touchscreen, and the computer executable instructions comprising:

detecting a screen touching gesture on a current page displayed on the touchscreen;

determining whether the screen touching gesture is a gesture for displaying a virtual home screen button, wherein:

the virtual home screen button is set to be displayed at a preset location on a multi-taskbar page that is configured to display representations of application programs that are currently running on the mobile terminal, the preset location of the virtual home screen button on the multi-taskbar page is adjustable in accordance with user input, and the mobile terminal has, according to prior user input, set a first location of the virtual home screen button on the multi-taskbar page as the preset location of the virtual home screen button, and recorded location coordinates of the first location of the virtual home screen button on the multi-taskbar page, including acquiring a respective location of the virtual home screen button on the multi-taskbar page with respect to the touchscreen of the mobile terminal and calculating the location coordinates of the first location using the respective location of the virtual home screen button on the multitask bar page with respect to the touchscreen of the mobile terminal;

displaying the virtual home screen button in accordance with a determination that the screen touching gesture on the current page is the gesture for displaying the virtual home screen button, wherein displaying the virtual home screen button further comprises displaying the multi-taskbar page, and displaying the virtual home screen button on the multi-taskbar page, and wherein the virtual home screen button is displayed at the first location which is the preset location on the multi-taskbar page that is adjustable in accordance with user input;

while displaying the virtual home screen button, detecting whether the virtual home screen button is tapped, wherein detecting whether the virtual home screen button is tapped further comprises:

detecting a tapping operation on the multi-taskbar page; and determining whether the virtual home screen button displayed on the multi-taskbar page is tapped according to the detected tapping operation and the recorded location coordinates of the first location of the virtual home screen button on the multi-taskbar page; and returning from the current page to the home screen in accordance with a determination that the virtual home screen button displayed on the multi-taskbar page is tapped.

8. The non-transitory computer readable storage medium according to claim 7, wherein the step of determining whether the screen touching gesture is the gesture for displaying a virtual home screen button further comprises:

determining whether a touching track corresponding to the screen touching gesture on the current page is identical to a preset track corresponding to the gesture for displaying the virtual home screen button; and when the touching track corresponding to the screen touching gesture on the current page is identical to the preset track corresponding to the gesture for displaying the virtual home screen button, determining that the screen touching gesture on the current page is the gesture for displaying the virtual home screen button.

9. The non-transitory computer readable storage medium according to claim 7, wherein determining whether the virtual home screen button displayed on the multi-taskbar page is tapped according to the detected tapping operation comprises:
positioning location coordinates of the detected tapping operation on the multi-taskbar page;
comparing the positioned location coordinates with the location coordinates of the virtual home screen button on the multi-taskbar page; and
when the positioned location coordinates are consistent with the location coordinates of the virtual home screen button on the multi-taskbar page, determining that the virtual home screen button displayed on the multi-taskbar page is tapped.

\* \* \* \* \*